United States Patent [19]
Wahlen et al.

[11] Patent Number: 4,943,149
[45] Date of Patent: Jul. 24, 1990

[54] TELESCOPE

[75] Inventors: Erika Wahlen, Erlinsbach, Switzerland; Dieter Hoffmann, Buchs, Fed. Rep. of Germany

[73] Assignee: Kern & Co. Ltd., Aarau, Switzerland

[21] Appl. No.: 241,249

[22] Filed: Sep. 7, 1988

[30] Foreign Application Priority Data

Sep. 8, 1987 [CH] Switzerland ................ 3451/87

[51] Int. Cl.⁵ .............................. G02B 23/16
[52] U.S. Cl. ............................ 350/568; 356/9; 356/18; 33/247; 33/292
[58] Field of Search ............ 350/568, 567, 245; 356/9, 18, 247; 33/227, 247, 252, 290, 292

[56] References Cited

U.S. PATENT DOCUMENTS

| | | | |
|---|---|---|---|
| 1,827,135 | 10/1931 | Blake | 356/254 |
| 3,433,571 | 3/1969 | Brunson | 33/290 |
| 3,970,274 | 7/1976 | Resk | 248/457 |
| 4,470,672 | 9/1984 | Drauglis | 350/568 |

FOREIGN PATENT DOCUMENTS 0520557  7/1976  U.S.S.R. .......................... 350/567

*Primary Examiner*—Bruce Y. Arnold
*Assistant Examiner*—Ronald M. Kachmarik
*Attorney, Agent, or Firm*—Burns, Doane, Swecker & Mathis

[57] ABSTRACT

A bearing bush with a side opening is mounted within a telescope barrel. The telescope thus may be easily mounted on a tilting axis by simply inserting an axle into the bush. Mounting and adjustment of the tilting axis within its bearings and of angular measuring systems is thus independent of mounting of the telescope.

5 Claims, 3 Drawing Sheets

TELESCOPE

BACKGROUND OF THE INVENTION

This invention relates to telescopes and has particular utility in surveying instruments such as theodolites.

For bearing a telescope on a tilting axis, known telescope barrels are provided with one or more axle arms which may rotate in appropriate bearings. Other known telescope barrels have bushings to receive plug-in axles which may facilitate mounting the telescopes in surveying instruments such as theodolites or levels, as shown in U.S. Pat. No. 4,681,433 (to Aeschlimann). Nevertheless, the mounting or demounting of a telescope on a tilting axis may be cumbersome if this can only be done at the same time as the mounting or demounting of a plug-in axle or axle arm.

One object of the present invention is to provide a telescope with a tilting axis in such a way that mounting and demounting of the telescope is possible without mounting and adjusting the tilting axis at the same time.

SUMMARY OF THE INVENTION

According to one aspect of the invention, a telescope comprises a telescope assembly having an object-side barrel with an objective lens and an eye-side barrel with an eyepiece each having an optical axis. A bearing bush is fixed between the two barrels and has its axis arranged substantially perpendicular to the optical axes of the barrels. The bush has a first aperture along its axis and directed sideways from the optical axes and a second and third aperture along the optical axes of the barrels to pass the optical path of the telescope. An axle fits into the first aperture of the bearing bush and has a central axis coincident with the tilting axis of the bearing bush.

According to another aspect of the invention, the optical axes of the object-side and the eye-side barrels of the telescope intersect the tilting axis, and the axle received in the bearing bush has an aperture for passing the optical path of the telescope. Means for securing the telescope assembly to the axle after its insertion into the bearing bush are provided. Bridging means for an open side of the first aperture in the bearing bush is detachably fixed to the bearing bush to mechanically stabilize the telescope assembly.

According to still another aspect of the invention, the telescope with the bearing bush is comprised in a surveying instrument such as a theodolite.

These and other objects, advantages and features of the present invention will be apparent to one skilled in the pertinent art from the accompanying description of a preferred embodiment of the invention and the appended claims when considered in conjunction with the drawings.

DETAILED DESCRIPTION OF A PREFERRED EMBODIMENT

Figure 1:
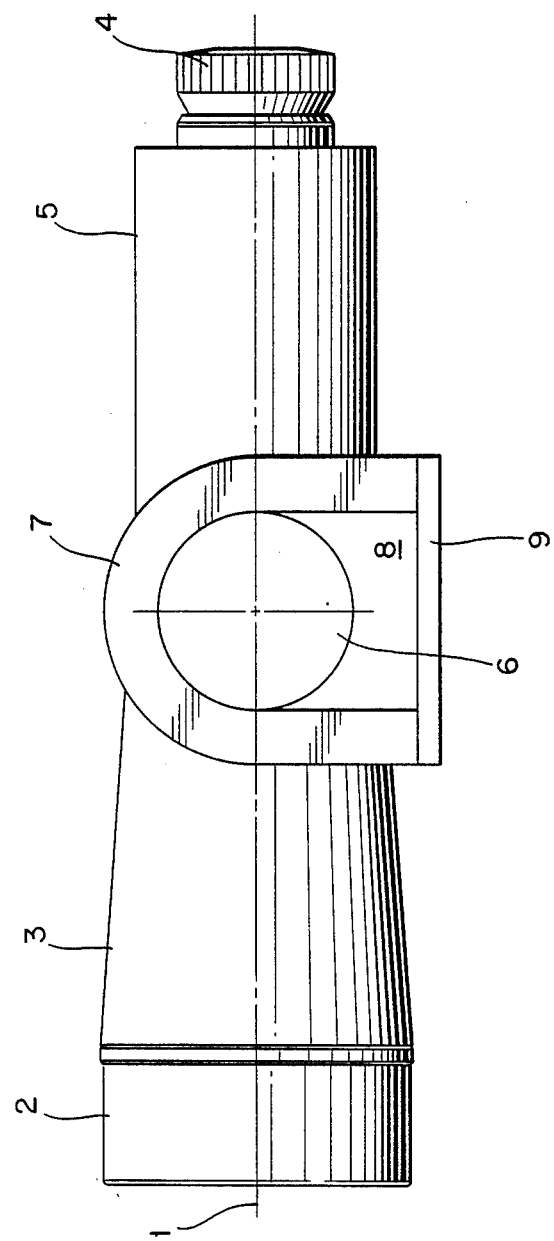
FIG. 1 is a schematic side view of a telescope with a tilting axle according to the invention.

The FIG. 1 shows a telescope having an optical axis 1 and comprising an objective lens 2, a telescope barrel 3 on the object-side, an eyepiece 4, and a barrel 5 on the eye-side. All these components are of cylindrical shape. A cylindrical bearing bush 7 bears on an axle 6 for tilting about an axis extending at right angles to the optical axis 1. The cylindrical bearing bush 7 is transversely inserted between the telescope barrels 3 and 5 on the object-side and on the eye-side respectively. This bearing bush mechanically joins the barrels 3 and 5 and is left open on the lower side, as shown at 8 in the FIG. 1. By means of the opening 8 of the bearing bush 7, the entire telescope can be easily mounted to the axle 6 and taken away again therefrom.

Figure 2:
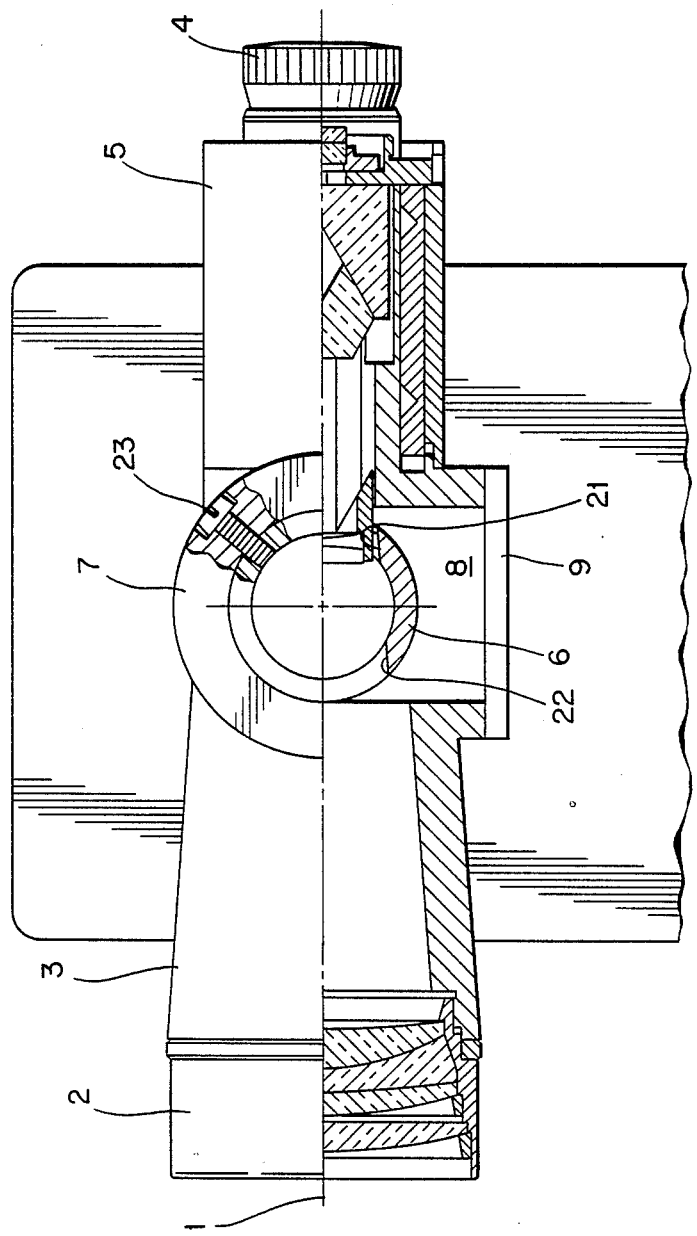
FIG. 2 is a side view of a telescope according to the invention with an axle having central apertures and a screw for joining in partial section.
Figure 3:
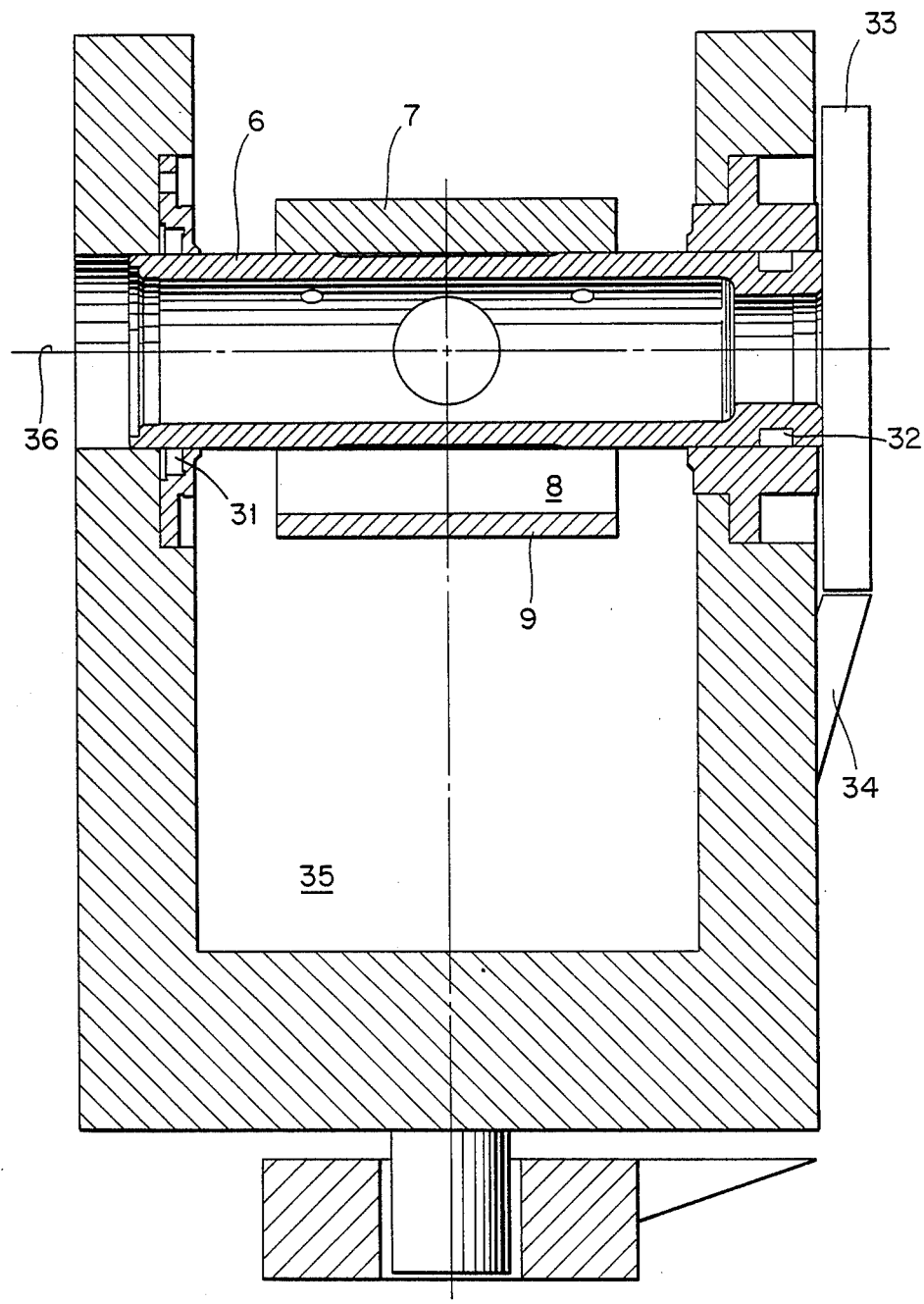
FIG. 3 is a sectional view of a theodolite with the telescope and axle as shown in FIG. 2, with bearings, graduated circle and angular reading system.

In order not to obstruct the optical ray path from the objective lens 2 to the eye-piece 4, central apertures not shown in the FIG. 1 are provided within the bearing bush 7 and the axle 6 around the optical axis 1. The central apertures 21 and 22 of the axle 6 are shown in the partial section of FIG. 2. After placing the bush 7 on the axle 6, a cap or slab 9 is fixed to the open side 8 of the bush 7, as by screws or other suitable means, to enhance its mechanical stability. Preferably the axle 6 is joined to the bush 7 by screws not shown in FIG. 1. A screw 23 for joining axle 6 to bush 7 is shown in FIG. 2. For tilting, the axle 6 is carried in bearings 31, 32 beside the telescope, as shown in FIG. 3. If the elevation angle of the telescope must be measured, an elevational graduated circle 33 is mounted on the axle 6. The circle cooperates with an angular reading system 34, preferably being part of a theodolite 35.

In case of the latter described use, mounting and demounting of the telescope is particularly simplified as compared to known systems, because no mounting and readjustment of the tilting axis 6 and angular reading system 34 is necessary after each change of a telescope. As shown in the preferred embodiment of the Figures, the optical axis 1 and the centerline 36 of the tilting axis do intersect. For other applications, eccentric mounts of a telescope according to the invention also may be advantageous.

What is claimed is:

1. A telescope comprising:
    a telescope assembly having an object-side barrel with an objective lens and an eye-side barrel with an eyepiece each having an optical axis;
    a bearing bush fixed between the object-side barrel and the eye-side barrel having its axis arranged substantially perpendicular to said optical axis to provide a tilting axis for said telescope, said bush having a first opening along its axis and directed sideways from the optical axes and having second and third apertures along the optical axes to pass the optical path of the telescope; and
    an axle fitting into said first opening of said bearing bush in coaxial relation to said tilting axis.

2. A telescope according to claim 1, wherein the optical axes of said object-side barrel and of said eye-side barrel intersect said tilting axis, and said axle has an aperture for passing the optical path of the telescope.

3. A telescope according to claim 1 having means for securing the telescope assembly to said axle after insertion of said axle into the bearing bush.

4. A telescope according to claim 1 having bridging means detachably fixed to said bearing bush and extending across said first opening along the axis of the bearing bush to mechanically stabilize the telescope assembly.

5. A surveying instrument such as a theodolite comprising a telescope as claimed in claim 1.